United States Patent [19]

Kubo et al.

[11] Patent Number: 5,024,767
[45] Date of Patent: Jun. 18, 1991

[54] METHOD FOR PURIFYING LIQUIDS

[75] Inventors: Nami Kubo; Toshio Yoshioka, both of Otsu; Kouichi Saito, Kasatsu; Syunroku Tohyama, Yasu, all of Japan

[73] Assignee: Toray Industries, Inc., Tokyo, Japan

[21] Appl. No.: 460,549

[22] Filed: Jan. 3, 1990

[30] Foreign Application Priority Data

Apr. 4, 1988 [WO] PCT Int'l Appl. ... PCT/JP88/00341

[51] Int. Cl.$^5$ .......................... B01D 15/04; C02F 1/42
[52] U.S. Cl. .................................... 210/682; 210/686; 210/290; 431/2
[58] Field of Search ............... 210/682, 686, 263, 290, 210/502.1, 505; 431/2; 521/29-31

[56] References Cited

U.S. PATENT DOCUMENTS

| | | | |
|---|---|---|---|
| 4,313,832 | 2/1982 | Shimizu et al. | 210/505 |
| 4,693,828 | 9/1987 | Yoshioka et al. | 210/685 |
| 4,747,955 | 5/1988 | Kunin | 210/505 |

Primary Examiner—Ivars Cintins
Attorney, Agent, or Firm—Nixon & Vanderhye

[57] ABSTRACT

The present invention relates to a method for purification of liquids. Fur particulars, the present invention relates to a method for purifying more precisely liquids in atomic power related fields, using a mixture of a polymer in which carboxyl groups are grafted onto a polyamide or a polyester as a cation exchanger and an anion exchanger.

13 Claims, No Drawings

METHOD FOR PURIFYING LIQUIDS

CROSS-REFERENCE TO RELATED APPLICATIONS

This application is a continuation of earlier application PCT/JP88/00341 filed Apr. 4, 1988.

The present invention relates to a method for the treatment and purification of liquids such as water for various uses, waste water and chemicals. Furthermore, the present invention relates to a method for purifying more liquids wherein a polymer prepared by grafting carboxyl groups onto a base of a polyamide or a polyester acts as a cation enchanger and an anion exchanger is mixed therewith.

Prior to this invention, to obtain a cation exchanger, methods in which sulfonic acid groups are introduced on a styrene polymer and methods in which carboxylic acid groups are introduced on an acrylic polymer have been mostly used. Cation exchangers containing sulfonic acid groups exhibit excellent ion exchangeability, but when these are discarded after use for waste liquid treatment, highly toxic SOx gases, such as $SO_2$ and $SO_3$, are generated on burning and cause severe corrosion of the incinerator. Therefore, incineration treatment can not be used. Recently, there has been an interest in removing suspended ionic solid substances in water recycling systems and pure water systems of atomic power stations and thermal power stations. Precoated filters in which filter elements are precoated with an ion exchanger have been recently utilized for removing these substances. However, a new problem occurred in which ion exchangers, contaminated with radioactive wastes, are produced after use and must be disposed of. Burning is the safest and most economical way to dispose of contaminaed ion exchangers, but as above described, it is not possible to burn the cation exchangers containing sulfonic acid groups, which can not be therefore used for this purpose. Moreover, to make disposal by incincration possible, if carboxylic acid groups are introduced on a styrene polymer, the reaction is considerably complicated and the economy is not favarable. Moreover, styrene polymer as the base has poor strength and is brittle, and thus another reinforcing material should be combined with it to mold it into a fiber. On the other hand, for treating liquids, fibers have advantages such that they have a larger surface area and are bulkier than those of particles and powders, and for these reasons have higher absorbing speed and better water permeability.

Moreover, polyacrylonitrile fibers on which carboxyl groups are introduced have a very high water content due to the inherent water retentive characteristics of acrylics and they swell and exhibit poor handling characteristics. As their ion exchange capacities can not be therefore elevated, their ion exchangability can not be correspondingly elevated.

The present invention provides a method for highly precise purification of a liquid by mixing a cation exchanger and an anion exchanger and treating the liquid with the mixed exchanger. Another purpose is to offer a polymer having sufficient ion exchangability, a low water content and good handling characteristics and can be treated without generating any toxic gas on burning. Also, these fibers can be easily and economically prepared.

DESCRIPTION OF THE INVENTION

This invention relates to a method for purification of liquids by treating a liquid requiring purification with a mixture of a polymer in which carboxyl groups are grafted onto a polyamide or a polyester acting as a cation exchanger and an anion exchanger. Highly precise purification of a solution can be performed using a polymer in which carboxyl groups are grafted onto a polyamide or a polyester as a cation exchanger and mixing an anion exchanger with it. Pure water of a specific electric resistance of 10 M$\Omega$·cm or higher can be continuously obtained by treating water with this mixture. It is very easy to impart a fibrous form to the said cation polymer. It is inexpensive and generates no toxic gas on burning thus spent exchnger, contaminated with radioactive waste, for example, can be conveniently and inexpensively disposed of by incineration. It can be therefore widely used and is preferably used for water recycling systems of atomic power stations by utilizing the above-described features.

The present invention will be explained in more detail hereinafter.

The cation exchanger used in the present invention must be able to be burned without untoward effects, easy to fabricate into a fibrous form and its exchange capacity is increased while the water content is depressed. A polymer having carboxyl groups grafted onto a polyamide or a polyester base polymer safisfies these objectives.

To perform a highly precise treatment of a liquid using such a polymer, it is important to fabricate a mixture of an anion exchanger with such polymer (a mixed bed type), because when graft polymerization is performed, a small amount of acrylic acid and methacrylic acid ungrafted remains as they or their polymers remain around the base after washing. There is also the possibility that ungrafted momomer or polymer may fall off during treatment of the liquid, but it is possible to adsorb them and to prevent contamination of the treated liquid by mixing the anion exchanger with it. Moreover, both anionically charged and cationically charged fine particles existing in the liquid to be treated can be ion-exchanged or adsorbed. Furthermore, cations and anions produced, when ion exchange is performed, can be respectively adsorbed by counter ion exchangers. Also, carboxyl groups have no ion exchangability for neutral salts as the carboxyl group is a weak acid. However, by using a strong anion exchanger as the anion exchanger, ion exchange is first performed from the anionic side to produce successively cations and therefore, even carboxyl groups can adsorb cations.

A mixed bed type system is required as leakage should be as low as possible during treatment of the liquid and to keep it durable. The mixed bed type system is needed because even a very slight leakage is not usually acceptable under such extremely severe conditions as recycling water containing radioactive substances in atomic power stations and in the production of ultrapure water.

Methods for grafting the carboxyl groups onto the base polymer are not limited and any conventionally known method can be used.

Grafting may be accomplished by mixing a commercially available polyamide with acrylic acid and methacrylic acid and reacting them using ammonium persulfate and a reducing agent as a catalyst under ordinary pressure at 70–80° C. for 60 min. Grafting may also be obtained by pretreating a polyester with a mixed solution of benzoyl peroxide, monochlorobenzene and a surface active agent, washing it with water, mixing it with acrylic acid and methacrylic acid, and reacting the mixture at 100° C. for 60 min. The graft ratio can be easily changed and exchange capacity and water content can be controlled.

As the polyamide onto which the carboxyl groups are attached according to the present invention, nylon 6, nylon 66, nylon 8, nylon 10 etc. can be mentioned. As the polyester, ordinary polyester made of terephthalic acid and ethylene glycol or butylene glycol or their modified substances can be cited. The polymer may be in resin, powder or fiber shape; the fibrous shape is most preferable as described above. When the polymer is fubricated into a fibrous shape, as the base polymer is at first spun then grafting is performed; the fibrous shape can be retained without using any reinforcing material and if a hollow fiber is used as the original fiber, a hollow ion exchange fiber can be prepared. As the shape of the fiber, well known optional shapes such as short fibers, filament yarns, felts, fabrics, non-woven fabrics, knitted fabrics, fiber bundles, strings, pulps, papers and cut portions of their assemblies can be cited. Especially, for muximum effectiveness short fibers can be finely and uniformly mixed with an anion exchanger. Fiber length is usually 3 mm or shorter and it is preferable, for efficacy, that such fibers be in the range of 0.1-1 mm. The fiber diameter is usually 500 $\mu$ or thinner and it is preferable that it is in the range of 1-100 $\mu$. When the fiber is too thick, the ion exchange velocity decreases and when it is too thin, it is hard to handle.

As the anion exchanger used in the present invention, polymers having primary, secondary or tertiary amino groups, quarternary ammonium groups, and polyamine groups can be cited. As described above, strong basic substances are preferable from the view point of treating characteristics; those which have quarternary ammonium groups, above all trimethyl ammonium groups, are preferably used. The shape is not specially limited and any convenient shape such as powder, granule, fiber as cited in the case of a cation exchanger can be used, but a powder shape is especially preferable to maximize effectiveness.

The mixing ratio of the anion exchanger and the cation exchanger is usually in the range of cation to anion of 1:100 to 100:1 as the ratio of total amount of exchange groups in the system; a ratio of 1:50 to 50:1 is preferable. As the cation exchanger, a mixture of a carboxylic acid type cation exchange fibers and a powdered carboxylic acid type cation exchange resin can be used, too.

The present invention can be applied in diverse fields, where ordinary ion exchange resins are used, such as desalting water, preparing of pure water, removal of harmful metals, separation of useful heavy metals, decoloring of various sugar liquids, desalting in general, purification and separation of antibiotics and various medical products and fluids, purification of various chemicals, purification and separation of amino acids, adsorption of surface active agents and adsorption of colloid substances. In particular, the present invention is particularly suited for use in the atomic power field.

The process of this invention is well suited for purifying water for various uses and especially waste water in the atomic power field essentially means recycling water, water for the fuel pool water for thecenter of a reactor, waste water from reverse washing for a desalting apparatus, blow water for steam generation, drain water and cavity water of a moisture separator, water for a suppression pool and the like. The method of the present invention is suitable for all of these treatments therefore is especially suitable for treating recycling water in atomic power stations.

The present invention is further illustrated by the following examples and is not restricted thereby.

The examples use the following methods of measurements:

(1) Water content is obtained by immersing a Na type (or Cl type) cation (or anion) exchanger in an ion exchange water, centrifuging it by means of a centrifugal dehydrator for domestic use to remove water on the surface, measuring the weight (W) at once and the weight (Wo) after absolute drying and obtaining the water content using the following equation.

$$Water\ content = (W - Wo)/Wo$$

(2) Exchange capacity is obtained by immersing an H type (or OH type) cation (or anion) exchanger in a NaOH (or HCl) solution of a known normality, performing ion exchange between them under stirring, quantitatively weighing, titrating and measuring.

(3) Ion exchange characteristics are judged by measuring how the specific electric resistivity of water flowing out of a column in which an ion exchanger is packed is elevated in comparison with that of water before feeding.

Here, according to present standards, a value of 10 M$\Omega$cm or high is considered to be good. This value is a level cleared by using a mixture of a powder cation exchange resin having sulfonic acid groups and a powder anion exchange resin in the atomic power plant filter precoat.

(4) Adsorbability for fine particles not ionized in a liquid is measured by passing a colloid solution through the ion exchanger and evaluating any colloid leak of the treated liquid. As the method of measurement, a turbidity measurement with UV light is used.

EXAMPLE 1

In a reactor wherein a tow of nylon staples (the diameter was 25 $\mu$m) was placed, an aqueous solution consisting of 1.5 parts of acrylic acid, 4.5 parts of methacrylic acid, 0.1 part of ammonium persulfate, 0.4 part of a commercially available reducing agent (the trade name is "Superlite C") and 93.5 parts of water was fed to immerse the tow in the solution at a bath ratio of 1:10. The reaction product, reacted at 80° C. for 60 min, was washed with water and a cation exchange fiber was obtained by adding sodium carbonate, carrying out an exchange reaction at 60° C. for 30 min and washing with water. (The exchange capacity was 3.7 meq/g and the water content was 1.2). The cation exchange fibers were cut to 0.5 mm in length, activated with an acid solution and washed with water. 1.5 g (dry weight) of this cation exchange resin and 0.5 g (dry weight) of a commercially available powder anion exchange resin "Powdex - PAO" (having trimethyl ammonium groups, an exchange capacity of 3.2 meq/g and a water content of 1.4, manufactured by Organo Co., Ltd.) wered mixed in an ion-exchanged water under stirring to make flocks, which were packed in a column (the diameter was 1.7 cm). Water having a specific electric resistivity of 0.4 M$\Omega$cm was passed through the column from the top with a flow speed of 15 ml/min and the specific electric resistivity after outflow of the water was measured. As a result, an ultrapure water having a specific electric resistivity of 10 MΩcm or higher is continuously obtained over a long period with a low resistance to liquid flow of only 0.09 kg/cm$^2$.

The cation exchange fibers used in this experiment were submitted to a burning test. An aqueous emulsion burning method, known as a method in which both the amount of exhaust gas and unburned rate were low and NOx generation was depressed, was used. The cation exchange fibers were emulsified and burnt to separate the gas and solid. The amount of SOx was measured using a gas filter and no generation of SOx from the fibers was detected.

COMPARATIVE EXAMPLE 1

In accordance with Example 1, 1.5 g (dry weight) of a commercially available powder cation exchange resin "Powdex-PCH" (having sulfonic acid groups, an exchange capacity of 5.0 and an water content of 1.6) and 0.5 g of an anion exchange resin ("Powdex-PAO", the same as used in Example 1) were mixed in an ion-exchanged water under stirring to make flocks, which were then packed in a column (the diameter was 1.7 cm) and the same water purification experiment as that of Example 1 was performed. A pure water having a specific electric resistivity of 10 MΩcm or higher was obtained, but the resistance to liquid flow was 0.9 Kg/cm$^2$, which was 10 times larger than the value in Example 1. This exchanger exhibited poor liquid flow characteristics.

The cation exchange resin "Powdex-PCH" used in this experiment was submitted to a burning test. The measurement was performed using the same procedure as used in Example 1 (the aqueous emulsion method) and 1080 ppm of SOx were measured from 2.7 kg (dry weight) of the resin.

COMPARATIVE EXAMPLE 2

1.5 g (dry weight) of cation exchange fibers prepared by the same procedure as used in Example 1 and activated with an acid were packed in an column (the diameter was 1.7 cm) and 0.5 g (dry weight) of the above described "Powdex-PAO" was packed in another column (the diameter was 1.7 cm). A water having a specific electric resistivity of 0.4 MΩcm was at first passed through the column of "Powdex-PAO" with a flow speed of 15 ml/min and the outflow water was then passed through the column of the cation exchange fibers. The specific electric resistivity of the outflow water was measured. As the result, water having a specific electric resistivity of 10 MΩcm or higher was not obtained using the double bed type.

EXAMPLE 2

1.5 g (dry weight) of cation exchange fibers prepared by the same procedure as used in Example 1 and activated with an acid and 0.5 g (dry weight) of the above described "Powdex-PAO" were mixed in an ion-exchanged water under stirring to make flocks, which were packed in a column (the diameter was 1.7 cm). A blood red ($Fe_2O_3$, O, 3μ) colloid solution of a concentration of 50 ppm was passed through the column from the top at a speed of 640 ml/hr and the relation between the concentration of the blood red in the outflow liquid and the liquid flow time was investigated. The results were shown in Table 1.

From these results, the following three points were confirmed. Namely, (1) the cation exchanger of the present invention had the same level of ion exchange characteristics are those for the commercially available "Powdex-PCH" having sulfonic acid groups yet the cation exchanger of this invention could be successfully (and acceptably) burned; (2) it had sufficient colloid adsorbing characteristics; and (3) it was essential for the highly precise treatment of a solution to use a mixed bed type with an anion exchanger.

EXAMPLE 3

Polyethylene terephthalate fibers (the diameter wa 25 μm) were immersed in a dispersing liquid consisting of 1 part of benzoyl peroxide, 5 parts of monochlorobenzene, 2 parts of "Plysurf A217E" (a surface active agent), 1,000 parts of water at a bath ratio of 1:50 at 80° C. for 30 min. The fibers were washed with water, reacted in a solution in which acrylic acid and methacrylic acid had been previously mixed at 100° C. for 60 min and again washed with water. Cation exchange fibers having carboxylic acid groups grafted onto the polyester fibers were thus puoduced having an exchange capacity of 2.1 meq/g and a water content of 0.48.

After purifying the thus-prepared fibers with methanol, cut fibers were made, transferred to a beaker and activated with an acid. 1.5 g (dry weight) of the thus-prepared fibers and 0.5 g of the above described anion exchange resin "Powdex-PAO" were mixed in an ion-exchanged water under stirring to make flocks, which were packed in a column (the diameter was 2.2 cm). Water having a specific electric resistivity of 0.4 MΩcm was passed through the column from the top with a flow speed of 15 ml/min and the specific electric resistivity of the outflow of the water was measured. A value of 10 MΩcm or higher was maintained for a long time.

In the same manner as Example 1, a sample of these polyester-based fibers was submitted to a burning test using an aqueous emulsion method. The amount of SOx was measured and generation of SOx from these fibers was not detected at all. From this result, like the polyamide fibers onto which carboxyl groups were grafted, it was also possible to graft carboxyl groups onto a polyester fiber, which when mixed with an anion exchanger was successfully used for a highly effective treatment of a contaminated solution.

TABLE 1

| Example | Ion exchanger Cation | Anion | Amount of $Fe_2O_3$ leakage (ppm) Water flow time (min) | | | | | | | | | | | | |
|---|---|---|---|---|---|---|---|---|---|---|---|---|---|---|---|
| | | | 10 | 20 | 30 | 40 | 50 | 60 | 90 | 120 | 150 | 180 | 210 | 240 | 270 | 300 |
| 2 | 1.5 g 5.6 meq | 0.5 g 1.6 meq | | | | | <0.1 | | | | 0.5 | 2.2 | 2.6 | 3.5 | 3.6 | 4 |

We claim:
1. A method of purifying a contaminated liquid comprising bringing the liquid into contact with a mixture of (1) a graft polymer, having carboxyl groups grafted onto a polyamide or polyester, as a cation exchanger, and (2) an anion exchanger.

2. A method of purifying contaminated water comprising passing it through an ion exchanger consisting essentially of (1) as a cation exchanger, a graft polymer having carboxyl groups grafted onto a polyamide or a polyester base, mixed with (2) an anion exchanger.

3. The method of claim 1 or claim 2 in which the graft polymer cation exchanger is in fibrous form.

4. The method of claim 1 or claim 2 in which the carboxyl groups are grafted onto polyamide fibers.

5. The method of claim 1 or claim 2 in which the carboxyl groups are grafted onto polyester fibers.

6. The method of claim 2 in which subsequent to treatment with the ion exchanger, the water has a specific conductivity of at least 10 M$\Omega$cm.

7. The method of claim 1 or claim 2 in which the water to be purified contains radioactive material that is removed by the ion exchange mixture.

8. The method of claim 1 or claim 2 in which the anion exchanger is a powdered anion exchange resin.

9. The method of claim 1 or claim 2 in which the anion exchanger has quarternary ammonium groups.

10. A method of purifying water contaminated with radioactive material comprising the steps of:
   (1) passing water contaminated with radioactive material through a mixed bed ion exchanger composed of a mixture of (a) as the cation exchanger, a polyamide or a polyester base polymer having carboxyl groups grafted thereto, and (b) an anion exchanger, and
   (2) removing the treated water from the mixed bed ion exchanger.

11. The process of claim 10 including the additional step of:
   (3) incinerating the ion exchanger when the amount of radioactive material thereon reaches a predetermined level.

12. An ion exchanger comprising a vessel with an inlet and an outlet, the vessel containing a mixture of (a) fibers of a graft polymer ion exchanger with carboxyl groups grafted onto a polyamide or a polyester base, the fibers being substantially devoid of a sytrene-based polymer ion exchanger with sulfonic acid groups, and (b) an anion exchanger.

13. A disposable, combustible ion exchange unit for treating water containing radioactive material comprising:
   a vessel having an inlet and an outlet, and within the vessel
   a mixed bed ion exchanger for removing radioactive contaminants from the water, the ion exchanger comprising as a cation exchanger, polyamide or polyester fibers onto which carboxyl groups are grafted, and a powdered anion exchange resin.

* * * * *